(12) United States Patent
Brunner et al.

(10) Patent No.: US 11,208,738 B2
(45) Date of Patent: Dec. 28, 2021

(54) MULTIFILAMENT POLYESTER FIBRES

(71) Applicant: Omya International AG, Oftringen (CH)

(72) Inventors: Martin Brunner, Wallbach (CH); Christoph Hirsiger, Koppigen (CH); Francesco Pullega, Bologna (IT); Samuel Rentsch, Spiegel bei Bern (CH); Michael Tinkl, Gipf-Oberfrick (CH)

(73) Assignee: Omya International AG, Oftringen (CH)

( * ) Notice: Subject to any disclaimer, the term of this patent is extended or adjusted under 35 U.S.C. 154(b) by 468 days.

(21) Appl. No.: 15/321,252

(22) PCT Filed: Jun. 18, 2015

(86) PCT No.: PCT/EP2015/063663
§ 371 (c)(1),
(2) Date: Dec. 22, 2016

(87) PCT Pub. No.: WO2016/000968
PCT Pub. Date: Jan. 7, 2016

(65) Prior Publication Data
US 2017/0204536 A1  Jul. 20, 2017

(30) Foreign Application Priority Data
Jul. 1, 2014 (EP) .................... 14175252

(51) Int. Cl.
| | | |
|---|---|---|
| *D01F 1/10* | (2006.01) | |
| *D01F 6/62* | (2006.01) | |
| *D01D 5/088* | (2006.01) | |
| *C08K 9/04* | (2006.01) | |
| *C01F 11/18* | (2006.01) | |
| *C08K 3/26* | (2006.01) | |
| *C09C 1/02* | (2006.01) | |
| *D04H 3/011* | (2012.01) | |

(52) U.S. Cl.
CPC ............. *D01F 1/10* (2013.01); *C01F 11/18* (2013.01); *C08K 3/26* (2013.01); *C08K 9/04* (2013.01); *C09C 1/021* (2013.01); *D01D 5/0885* (2013.01); *D01F 6/62* (2013.01); *D04H 3/011* (2013.01); *C08K 2003/265* (2013.01)

(58) Field of Classification Search
CPC .... D01F 1/10; D01F 6/62; C08K 9/04; C08K 3/26; C08K 2003/265; D01D 5/0885; D04H 3/011; C09C 1/021; C01F 11/18
See application file for complete search history.

(56) References Cited

U.S. PATENT DOCUMENTS

| | | | | |
|---|---|---|---|---|
| 3,259,681 A | * | 7/1966 | Thomas | ............ D01F 6/62 264/177.13 |
| 3,928,696 A | * | 12/1975 | Wandel | ............ D04H 1/593 428/102 |
| 6,171,685 B1 | | 1/2001 | George et al. | |
| 6,797,377 B1 | | 9/2004 | DeLucia et al. | |
| 2003/0204000 A1 | | 10/2003 | Jen | |
| 2004/0186214 A1 | * | 9/2004 | Li | ............ C08L 23/20 524/474 |
| 2006/0047023 A1 | * | 3/2006 | Craig | ............ C08K 9/04 523/210 |
| 2009/0104831 A1 | | 4/2009 | Bornemann et al. | |
| 2011/0040011 A1 | | 2/2011 | Feichtinger et al. | |
| 2011/0059287 A1 | * | 3/2011 | McAmish | ............ C08J 3/226 428/87 |
| 2012/0031576 A1 | | 2/2012 | Gane et al. | |
| 2015/0065633 A1 | | 3/2015 | Feichtinger et al. | |
| 2015/0191853 A1 | | 7/2015 | Bornemann et al. | |

FOREIGN PATENT DOCUMENTS

| | | |
|---|---|---|
| CN | 102330191 A | 1/2012 |
| EP | 2070991 A1 | 6/2009 |
| EP | 2159258 A1 | 3/2010 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2465986 A1 | 6/2012 |
| EP | 2524898 A1 | 11/2012 |
| JP | H01272659 A | 10/1989 |
| JP | H05295166 A | 11/1993 |
| JP | H11170467 A | 6/1999 |
| JP | 2002069742 A | 3/2002 |
| JP | 2003265046 A | 9/2003 |

(Continued)

OTHER PUBLICATIONS

Characteristics of the Treated Ground Calcium Carbonate Powder with Stearic Acid Using the Dry Process Coating System, Jeong et al, Jan. 21, 2009; pp. 409-414.*
International Search Report dated Sep. 28, 2015 for PCT/EP2015/063663.
Written Opinion of International Searching Authority dated Sep. 28, 2015 for PCT/EP2015/063663.
JP Publication No. JP2002069742 (A) (Mar. 8, 2002)—English-language abstract from Espacenet, 1 page.
JP Publication No. JP2003265046 (A) (Sep. 24, 2003)—English-language abstract from Espacenet, 2 pages.
JP Publication No. JP2004043673 (A) (Feb. 12, 2004)—English-language abstract from Espacenet, 1 page.

(Continued)

*Primary Examiner* — Elizabeth C Imani
(74) *Attorney, Agent, or Firm* — ALGM LLP; Harry J. Guttman

(57) ABSTRACT

The present invention concerns a multifilament fibre comprising at least one polymer comprising a polyester, and at least one filler comprising calcium carbonate. The present invention further relates to a process of producing such a multifilament fibre as well as the use of calcium carbonate as filler in a multifilament fibre comprising at least one polymer comprising a polyester.

20 Claims, No Drawings

(56) References Cited

FOREIGN PATENT DOCUMENTS

| | | | |
|---|---|---|---|
| JP | 2004043673 A | 2/2004 | |
| JP | 2004263959 A | 9/2004 | |
| JP | 2005075895 A | 3/2005 | |
| JP | 2005112402 A | 4/2005 | |
| JP | 2005254610 A | 9/2005 | |
| JP | 2011207926 A | 10/2011 | |
| TW | 570953 | 1/2004 | |
| WO | 9730199 A1 | 8/1997 | |
| WO | 2006/054475 A1 | 5/2006 | |
| WO | 2006121054 A1 | 11/2006 | |
| WO | 2007124866 A1 | 11/2007 | |
| WO | 2008077156 A2 | 6/2008 | |
| WO | 2009074492 A1 | 6/2009 | |
| WO | 2009094321 A1 | 7/2009 | |
| WO | 2009121085 A1 | 10/2009 | |
| WO | 2011028934 A1 | 3/2011 | |
| WO | 2012052778 A1 | 4/2012 | |
| WO | 2014060286 A1 | 4/2014 | |
| WO | WO-2014128087 A1 * | 8/2014 | ............ C09C 3/08 |

OTHER PUBLICATIONS

JP Publication No. JP2004263959 (A) (Sep. 24, 2004)—English-language abstract from Espacenet, 1 page.

JP Publication No. JP2005075895 (A) (Mar. 24, 2005)—English-language abstract from Espacenet, 1 page.

JP Publication No. JP2005112402 (A) (Spr. 28, 2005)—English-language abstract from Espacenet, 1 page.

JP Publication No. JP2005254610 (A) (Sep. 22, 2005)—English-language abstract from Espacenet, 1 page.

JP Publication No. JP2011207926 (A) (Oct. 20, 2011)—English-language abstract from Espacenet, 1 page.

JP Publication No. JPH01272659 (A) (Oct. 31, 1989)—English-language abstract from Espacenet, 1 page.

JP Publication No. JPH05295166 (A) (Nov. 9, 1993)—English-language abstract from Espacenet, 1 page.

IUPAC. Compendium of Chemical Terminology, 2nd ed. (the "Gold Book"). Compiled by A D. McNaught and A. Wilkinson. Blackwell Scienlific Publications, Oxford (1997). XML on-line corrected version: http://goldbook.iupac.org (2006-) created by M. Nic, J. Jirat, B. Kosala; updates compiled by A. Jenkins. ISBN 0-9678550-9-8. https://doi.org/10.1351/goldbook. (1 page).

Wikipedia—Fatty Acid (last accessed Jan. 2019) (6 pages).

JP Publication No. JPH11170467A (dated Jun. 29, 1999)—English-language abstract from Espacenet, 1 page.

ROTHON (2002) Particulate Fillers for Polymers, Rapra Technology Limited, Shrewsbury, UK (161 pages).

* cited by examiner

MULTIFILAMENT POLYESTER FIBRES

CROSS-REFERENCE TO RELATED APPLICATIONS

This is a U.S. national phase of PCT Application No. PCT/EP2015/063663, filed Jun. 18, 2015, which claims priority to European Application No. 14175252.7, filed Jul. 1, 2014.

The present invention is directed to a multifilament fibre, a process for preparing a multifilament fibre, articles containing multifilament fibres, and the use of said multifilament fibres as well as the use of calcium carbonate as fillers for multifilament fibres.

Multifilament fibres usually consist of a multitude of fine, continuous filaments, which can be twisted tightly together or can be held together with minimal or no twist. In contrast, spun fibres are composed of short staple fibres, or long filament fibres that have been cut into short staple fibres. The staple fibres are twisted together to form spun fibres.

Compared to monofilament fabrics, multifilament fabrics may provide better retention, e.g. better filter efficiency, and lower throughput. Furthermore, multifilament fibres are flexible, easy to handle, can be woven into any kind of fabric. Monofilament fibres, on the other hand, are more expensive and have usually a larger diameter, which may be a disadvantage for certain applications.

Multifilament fibres can be processed further into textile articles by layering, plaiting, braiding, knotting, weaving, knitting, crocheting, or tufting. Today, many textile materials are produced from thermoplastic polymers such as polypropylene, polyethylene, polyamides, or polyesters. The advantage of polyester fibres or filaments is their high crystallinity, high strength and high tenacity. Polyethylene terephthalate (PET) is the most widely used polyester class and is characterized by high modulus, low shrinkage, heat set stability, light fastness and chemical resistance account for the great versatility of PET. One major drawback of PET is its slow crystallization rate, which does not allow reasonable cycle times for manufacturing processes such as injection moulding. Therefore nucleating agents such as talc are often added. However, these heterogeneous particles can act as stress concentrators, and thereby, may affect the mechanical properties of the polymer. Therefore, nucleated PET is often reinforced with glass fibres.

A talc filled PET is disclosed in the article of Sekelik et al. entitled "Oxygen barrier properties of crystallized and talc-filled poly(ethylene terephthalate)" published in Journal of Polymer Science: Part B: Polymer Physics, 1999, 37, 847 to 857. U.S. Pat. No. 5,886,088 A is concerned with a PET resin composition comprising an inorganic nucleating agent. A method for producing a thermoplastic polymer material, which is filled with calcium carbonate is described in WO 2009/121085 A1.

WO 2012/052778 A1 relates to tearable polymer films comprising a polyester and calcium carbonate or mica fillers. The spinning of PET fibres containing modified calcium carbonate was studied by Boonsri Kusktham and is described in the article entitled "Spinning of PET fibres mixed with calcium carbonate", which was published in the Asian Journal of Textile, 2011, 1(2), 106 to 113.

Extruded fibres and nonwoven webs containing titanium dioxide and at least one mineral filler are disclosed in U.S. Pat. No. 6,797,377 B1. WO 2008/077156 A2 describes spunlaid fibres comprising a polymeric resin and one filler as well as nonwoven fabrics containing said fibres. Nonwovens of synthetic polymers with an improved binding composition are disclosed in EP 2 465 986 A1. WO 97/30199 relates to fibres or filaments suitable for the production of a nonwoven fabric, the fibres or filaments consisting essentially of a polyolefin and inorganic particles.

WO 2009/094321 A1 discloses monofilament fibres comprising at least one polymeric resin and at least one coated filler. Staple fibres, comprising at least one polymeric resin and at least one coated filler are described in WO 2011/028934 A1. The preparation of polybutylene terephthalate/calcium carbonate composites is disclosed in an article of Deshmukh et al., entitled "Effect of uncoated calcium carbonate and stearic acid coated calcium carbonate on mechanical, thermal and structural properties of poly(butylenes terephthalate) (PBT)/calcium carbonate composites", which was published in Bulletin of Material Science, 2010, 33(3), 277-284.

The effect of fillers on the performance of natural fibre composites was studied by Kanakasabai et al. in the article "Effect of fabric treatment and filler content on jute polyester composites", published in International Journal of Plastic Technology, 2007, 11, 1-31. CS 269 812 B1 discloses a method for manufacturing polyester fibres containing calcium carbonate, wherein the calcium carbonate is added to the reaction mixture of the polyester during the transesterification state or at the beginning of the polycondensation. WO 2007/124866 A1 is directed to a polymer fibre comprising a thermoplastic polymer and a filler, and non-woven materials produced thereof.

Furthermore, reference is made to the unpublished European patent application no. 12 199 746.4.

In view of the foregoing, improving the properties of polyester-based textile materials remains of interest to the skilled man.

It is an object of the present invention to provide a multifilament fibre having an improved mechanical stiffness, thermal conductivity, and increased opacity. It would also be desirable to provide a multifilament fibre which can be tailored with respect to its hydrophobic or hydrophilic properties. It would also be desirable to provide a multifilament fibre containing a reduced amount of polymer without affecting the quality of the multifilament fibre significantly. It would also be desirable to provide a multifilament fibre which can be produced with higher productivity, lower carbon footprint, and at lower costs.

It also an object of the present invention to provide a process for producing a multifilament fibre from a polyester based polymer composition, which allows short cycle times during melt processing. It is also desirable to provide a process for producing a multifilament fibre which allows the use of recycled polyester material, especially recycled PET.

The foregoing objects and other objects are solved by the subject-matter as defined herein in the independent claims.

According to one aspect of the present invention, a multifilament fibre is provided comprising at least one polymer comprising a polyester, and at least one filler comprising calcium carbonate, wherein the calcium carbonate is present in the multifilament fibre in an amount of at least 2 wt.-%, based on the total weight of the multifilament fibre.

According to another aspect, a textile article comprising at least one multifilament fibre according to the present invention is provided.

According to still another aspect a process for producing a multifilament fibre is provided, comprising the steps of
a) providing a mixture comprising at least one polymer comprising a polyester and at least one filler comprising calcium carbonate, b) melting the mixture of step a) and passing the same through shaped orifices to form a multifilament fibre, and c) quenching the multifilament fibre, wherein the calcium carbonate is present in the multifilament fibre in an amount of at least 2 wt.-%, based on the total weight of the multifilament fibre.

According to still another aspect, the use of calcium carbonate as filler in a multifilament fibre comprising at least one polymer comprising a polyester is provided, wherein the calcium carbonate is present in the multifilament fibre in an amount of at least 2 wt.-%, based on the total weight of the multifilament fibre.

According to still another aspect, the use of at least one multifilament fibre according to the present invention for producing a textile article is provided.

According to still another aspect, the use of at least one multifilament fibre according to the present invention and/or a textile article according to the present invention in construction products, waterproofing, thermal insulation, soundproofing, roofing, consumer apparel, upholstery and clothing industries, industrial apparel, medical products, home furnishings, protective products, packaging materials, cosmetic products, hygiene products, filtration materials, agritechnical applications, building application, geotechnical applications, industrial applications, medical applications, transporting, ecotechnical applications, packaging applications, personal protection, property protection, or sport applications is provided.

Advantageous embodiments of the present invention are defined in the corresponding sub-claims.

According to one embodiment of the present multifilament fibre, the polyester is selected from the group consisting of a polyglycolic acid, a polycaprolactone, a polyethylene adipate, a polyhydroxyalkanoate, a polyhydroxybutyrate, a polyalkylene terephthalate, a polyethylene terephthalate, a polytrimethylene terephthalate, a polybutylene terephthalate, a polyethylene naphthalate, a polylactic acid, or a mixture thereof, or copolymers thereof, preferably the polyester is a polyethylene terephthalate and/or a polybutylene terephthalate.

According to another embodiment of the present multifilament fibre, the calcium carbonate is ground calcium carbonate, precipitated calcium carbonate, modified calcium carbonate, surface-treated calcium carbonate, or a mixture thereof, preferably surface-treated calcium carbonate.

According to yet another embodiment of the present multifilament fibre, the calcium carbonate is a surface-treated calcium carbonate comprising on at least a part of its accessible surface area a treatment layer comprising a hydrophobising agent, preferably the hydrophobising agent is selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, and mixtures thereof, and more preferably the hydrophobising agent is a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof and/or a phosphoric acid ester blend of one or more phosphoric acid mono-ester and/or reaction products thereof and one or more phosphoric acid di-ester and/or reaction products thereof.

According to one embodiment of the present multifilament fibre, the calcium carbonate has a weight median particle size $d_{50}$ from 0.1 to 3 µm, preferably from 0.4 to 2.5 µm, more preferably from 1.0 to 2.3 µm, and most preferably from 1.2 to 2.0 µm.

According to another embodiment of the present multifilament fibre, the calcium carbonate is present in the multifilament fibre in an amount from 2 to 50 wt.-%, preferably from 5 to 40 wt.-%, more preferably from 8 to 35 wt.-%, and most preferably from 10 wt.-% to 30 wt.-%, based on the total weight of the multifilament fibre.

According to yet another embodiment of the present multifilament fibre, the multifilament fibre has a linear mass density from 0.5 to 4000 dtex, preferably from 1 to 3000 dtex, more preferably from 10 to 2000 dtex, and most preferably from 100 to 1500 dtex.

According to one embodiment of the present textile article, said article is selected from construction products, consumer apparel, industrial apparel, medical products, home furnishings, protective products, packaging materials, cosmetic products, hygiene products, filtration materials, hoses, power belts, ropes, nets, threads, tire cords, auto upholsteries, sails, floppy disk liners, or fibrefills.

According to one embodiment of the present process for producing a multifilament fibre, the mixture of step a) is a mixture of a masterbatch and an additional polymer, wherein the masterbatch comprises at least one polymer comprising a polyester and at least one filler comprising calcium carbonate, preferably in the masterbatch the calcium carbonate is present in an amount from 10 to 85 wt.-%, preferably from 20 to 80 wt.-%, more preferably from 30 to 75 wt.-%, and most preferably from 40 wt.-% to 75 wt.-%, based on the total weight of the masterbatch.

According to another embodiment of the present process, the process further comprises a step d) of drawing the multifilament fibre.

It should be understood that for the purpose of the present invention, the following terms have the following meaning:

The term "degree of crystallinity" as used in the context of the present invention refers to the fraction of the ordered molecules in a polymer. The remaining fraction is designated as "amorphous". Polymers may crystallize upon cooling from the melt, mechanical stretching or solvent evaporation. Crystalline areas are generally more densely packed than amorphous areas and crystallization may affect optical, mechanical, thermal and chemical properties of the polymer. The degree of crystallinity is specified in percent and can be determined by differential scanning calorimetry (DSC).

For the purpose of the present invention, the term "dtex" refers to the linear mass density of a fibre and is defined as the mass in grams per 10000 metres.

"Ground calcium carbonate" (GCC) in the meaning of the present invention is a calcium carbonate obtained from natural sources, such as limestone, marble, dolomite or chalk, and processed through a wet and/or dry treatment such as grinding, screening and/or fractionation, for example by a cyclone or classifier.

The term "intrinsic viscosity" as used in the context of the present invention is a measure of the capability of a polymer in solution to enhance the viscosity of the solution and is specified in dl/g.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, EP 2 070 991 A1, or 2 264 108 A1.

A "fibre" in the meaning of the present invention is a long, fine continuous substance having a high ratio of length to cross sectional area and a thread-like morphology.

A "filament" in the meaning of the present invention is a fibre of very great length, considered as continuous. A "multifilament fibre" in the meaning of the present invention is a fibre being composed of two or more filaments. Preferably the multifilament fibre is a multifilament yarn.

As used herein, the term "textile article" refers to a product produced by methods such as by layering, plaiting, braiding, knotting, weaving, knitting, crocheting, or tufting. For the purpose of the present invention, the term "woven fabric" refers to a textile article produced by weaving, and, the term "nonwoven fabric" refers to a flat, flexible, porous sheet structure that is produced by interlocking layers or networks of fibres, filaments, or film-like filamentary structures.

Throughout the present document, the "particle size" of a calcium carbonate filler is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

As used herein the term "polymer" generally includes homopolymers and co-polymers such as, for example, block, graft, random and alternating copolymers, as well as blends and modifications thereof.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2,524,898 A1, EP 2 371 766 A1, or unpublished European patent application no. 12 164 041.1.

In the meaning of the present invention, a "surface-treated calcium carbonate" is a ground, precipitated or modified calcium carbonate comprising a treatment or coating layer, e.g. a layer of a hydrophobising agent, fatty acids, surfactants, siloxanes, or polymers.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive multifilament fibre comprises at least one polymer comprising a polyester and at least one filler comprising calcium carbonate. The calcium carbonate is present in the multifilament fibre in an amount of at least 2 wt.-%, based on the total weight of the multifilament fibre. In the following details and preferred embodiments of the inventive product will be set out in more detail. It is to be understood that these technical details and embodiments also apply to the inventive process for producing said multifilament fibre and the inventive use of the multifilament fibre and calcium carbonate.

The at Least One Polymer

The multifilament fibre of the present invention comprises at least one polymer comprising a polyester.

Polyesters are a class of polymers which contain the ester functional group in their main chain and are generally obtained by a polycondensation reaction. Polyesters may include naturally occurring polymers such as cutin as well as synthetic polymers such as polycarbonate or poly butyrate. Depending on their structure polyesters may be biodegradable. The term "biodegradable" within the meaning of the present invention relates to a substance or object capable of being broken down or decomposed with the help of bacteria or other living organisms and thereby avoiding environmental pollution.

According to one embodiment, the polyester is selected form the group consisting of a polyglycolic acid, a polycaprolactone, a polyethylene adipate, a polyhydroxyalkanoate, a polyhydroxybutyrate, a polyalkylene terephthalate, a polyethylene terephthalate, a polytrimethylene terephthalate, a polybutylene terephthalate, a polyethylene naphthalate, a polylactic acid, or a mixture thereof, or copolymers thereof. Any of these polymers may be in pure form, i.e. in form of a homopolymer, or may be modified by copolymerization and/or by adding one or more substituents to the main chain or side chains of the main chain.

According to one embodiment of the present invention, the at least one polymer consists of a polyester. The polyester may consist of only one specific type of polyester or a mixture of one or more types of polyesters.

The at least one polymer can be present in the multifilament fibre in an amount of at least 40 wt.-%, preferably of at least 60 wt.-%, more preferably of at least 80 wt.-%, and most preferably of at least 90 wt.-%, based on the total weight of the multifilament fibre.

According to one embodiment, the at least one polymer is present in the nonwoven fabric in an amount from 50 to 98 wt.-%, preferably from 60 to 95 wt.-%, more preferably from 65 to 92 wt.-%, and most preferable from 70 to 90 wt.-%, based on the total weight of the multifilament fibre.

According to one embodiment, the polyester has an intrinsic viscosity, IV, from 0.2 to 2 dl/g, preferably from 0.3 to 1.5 dl/g, and more preferably from 0.4 to 1 dl/g, for example, from 0.4 to 0.7 dl/g or from 0.7 to 1 dl/g.

According to one embodiment, a polyester is obtained from polycondensation of terephthalic acid or one of its polyester-forming derivates and a diol. Suitable polyester-forming derivates of terephthalic acid are dimethyl terephthalate, diethyl terephthalate, dipropyl terephthalate, dibutyl terephthalate, or mixtures thereof. Examples of suitable diols are alkanediols, e.g. alkanediols having 2 to 12 carbon atoms in the carbon chain such as ethylene glycol, propanediol, butanediol, pentanediol, hexanediol, heptanediol, octanediol, nonanediol, decanediol, undecanediol, dodecanediol, or mixtures thereof.

According to one embodiment, the polyester is a polyalkylene terephthalate.

A part of the terephthalic acid or one of its polyester-forming derivates in the polyalkylene terephthalate can be replaced by other dicarboxylic acids. Examples of suitable dicarboxylic acids are isophthalic acid, phthalic acid, 1,4-cylclohexanedicarboxylic acid, naphthalene-2,6-dicarboxylic acid, adipic acid, sebacic acid or decanedicarboxylic acid. According to one embodiment up to 5 mol-%, preferably up to 10 mol-%, more preferably up to 20 mol-%, and most preferably up to 30 mol-% of the terephthalic acid or one of its polyester-forming derivates in the polyalkylene terephthalate are replaced by other dicarboxylic acids.

A part of the alkanediol in the polyalkylene terephthalate can be replaced by other diols. Examples of suitable other diols are neopentyl glycol, 1,4- or 1,3-dimethylolcyclohexane.

According to one embodiment up to 5 mol-%, preferably up to 10 mol-%, more preferably up to 20 mol-%, and most preferably up to 30 mol-% of the alkanediol in the polyalkylene terephthalate are replaced by other diols.

According to the present invention the polyalkylene terephthalate comprises unmodified and modified terephthalate. The polyalkylene terephthalate may be a linear polymer, a branched polymer, or a cross-linked polymer. For example, if glycerol is allowed to react with a diacid or its anhydride each glycerol unit will generate a branch point. If internal coupling occurs, for example, by reaction of a hydroxyl group and an acid function from branches at the same or a different molecule, the polymer will become crosslinked.

Optionally, the polyalkylene terephthalate can be substituted, preferably with a $C_1$ to $C_{10}$ alkyl group, a hydroxyl, and/or an amine group. According to one embodiment, the polyalkylene terephthalate is substituted with a methyl, ethyl, propyl, butyl, tert.-butyl, hydroxyl and/or amine group.

According to a preferred embodiment of the present invention, the polyester is a polyethylene terephthalate and/or a polybutylene terephthalate.

Polyethylene terephthalate (PET) is a condensation polymer and may be industrially produced by forming the condensate from either terephthalic acid or dimethyl terephthalate with ethylene glycol. Similarly, polybutylene terephthalate (PBT) can be obtained by condensating either terephthalic acid or dimethyl terephthalate with butylene glycol.

PET may be polymerized by ester interchange employing the monomers diethyl terephthalate and ethylene glycol or direct esterification by employing the monomers terephthalic acid and ethylene glycol. Both ester interchange and direct esterification processes are combined with polycondensation steps either batch-wise or continuously. Batch-wise systems require two reaction vessels; one for esterification or ester interchange and one for polymerization. Continuous systems require at least three vessels; one for esterification or ester interchange, another for reducing excess glycols, and still another for polymerization.

Alternatively, PET may be produced by solid-phase polycondensation. For example, in such a process a melt polycondensation is continued until the pre-polymer has an intrinsic viscosity of 1.0 to 1.4 dl/g, at which point the polymer is cast into a solid film. The pre-crystallization is carried out by heating, e.g. above 200° C., until the desirable molecular weight of the polymer is obtained.

According to one embodiment, PET is obtained from a continuous polymerization process, a batch-wise polymerization process or a solid phase polymerization process. PBT may be obtained in a similar way as described for PET.

According to the present invention, the terms "polyethylene terephthalate" or "polybutylene terephthalate" comprise unmodified and modified polyethylene or polybutylene terephthalate, respectively. The polyethylene terephthalate or polybutylene terephthalate may be a linear polymer, a branched polymer, or a cross-linked polymer. For example, if glycerol is allowed to react with a diacid or its anhydride each glycerol will generate a branch point. If internal coupling occurs, for example, by reaction of a hydroxyl group and an acid function from branches at the same or a different molecule, the polymer will become crosslinked. Optionally, the polyethylene terephthalate can be substituted, preferably with a $C_1$ to $C_{10}$ alkyl group, a hydroxyl, and/or an amine group. According to one embodiment, the polyethylene terephthalate is substituted with a methyl, ethyl, propyl, butyl, tert.-butyl, hydroxyl and/or amine group. The polyethylene terephthalate or polybutylene terephthalate can also be modified by co-polymerization, e.g. with cyclohexane dimethanol or isophthalic acid.

Depending on its processing and thermal history, PET and/or PBT may exist both as an amorphous and as a semi-crystalline polymer, i.e. as a polymer comprising crystalline and amorphous fractions. The semi-crystalline material can appear transparent or opaque and white depending on its crystal structure and particle size.

According to one embodiment, the PET and/or PBT is/are amorphous. According to another embodiment, the PET and/or PBT is semi-crystalline, preferably the PET and/or PBT has/have a degree of crystallinity of at least 20%, more preferably of at least 40%, and most preferably of at least 50%. According to still another embodiment, the PET and/or PBT has/have a degree of crystallinity from 10 to 80%, more preferably from 20 to 70%, and most preferably from 30 to 60%. The degree of crystallinity may be measured with differential scanning calorimetry (DSC).

According to one embodiment of the present invention, the PET and/or PBT has/have an intrinsic viscosity, IV, from 0.2 to 2 dl/g, preferably from 0.3 to 1.5 dl/g, and more preferably from 0.4 to 1 dl/g, for example, from 0.4 to 0.7 dl/g or from 0.7 to 1 dl/g.

According to another embodiment of the present invention, the PET and/or PBT has/have a glass transition temperature, $T_g$, from 50 to 200° C., preferably from 60 to 180° C., and more preferably from 70 to 170° C.

According to one embodiment of the present invention, the PET and/or PBT has/have a number average molecular weight from 5000 to 100000 g/mol, preferably from 10000 to 50000 g/mol, and more preferably from 15000 to 20000 g/mol.

The polyester may be a virgin polymer, a recycled polymer, or a mixture thereof. A recycled polyethylene terephthalate may be obtained from post consumed PET bottles, preform PET scrap, regrained PET, or reclaimed PET.

According to one embodiment, the polyester includes 10 wt.-%, preferably 25 wt.-%, more preferably 50 wt.-%, and most preferably 75 wt.-% recycled polyester, based on the total amount of the polyester.

According to one embodiment, the at least one polymer consists of a polyethylene terephthalate. The PET may consist of only one specific type of PET or a mixture of two or more types of PET. According to another embodiment, the at least one polymer consists of a polybutylene terephthalate. The PBT may consist of only one specific type of PBT or a mixture of two or more types of PBT. According to still another embodiment, the at least one polymer consists of a mixture of PET and PBT, wherein the PET may consist of only one specific type of PET or a mixture of two or more types of PET and the PBT may consist of only one specific type of PBT or a mixture of two or more types of PBT.

According to one embodiment, the at least one polymer comprises further polymers, preferably polyolefines, polyamides, cellulose, polybenzimidazoles, or mixtures thereof, or copolymers thereof. Examples for such polymers are polyhexamethylene diadipamide, polycaprolactam, aromatic or partially aromatic polyamides ("aramids"), nylon, polyphenylene sulphide (PPS), polyethylene, polypropylene, polybenzimidazoles, or rayon.

According to one embodiment, the at least one polymer comprises at least 50 wt.-%, preferably at least 75 wt.-%, more preferably at least 90 wt.-%, and most preferably at least 95 wt.-% of a polyester, based on the total amount of the at least one polymer. According to another embodiment, the at least one polymer comprises at least 50 wt.-%, preferably at least 75 wt.-%, more preferably at least 90 wt.-%, and most preferably at least 95 wt.-% of PET and/or PBT, based on the total amount of the at least one polymer.

The at Least One Filler

According to the present invention, the multifilament fibre comprises at least one filler comprising a calcium carbonate. The at least one filler is dispersed within the at least one polymer.

The use of at least one filler comprising calcium carbonate in polyester-based multifilament fibres has certain advantages compared to conventional multifilament fibres. For example, the hydrophobic or hydrophilic properties of the multifilament fibres can be adapted to the intended application by using an appropriate calcium carbonate filler. Furthermore, the use of calcium carbonate fillers allows for the reduction of polyesters in the production of multifilament fibres without affecting the quality of the multifilament fibres significantly. Moreover, the inventors surprisingly found that if calcium carbonate is added as filler to a polyester such as PET, the polymer exhibits a higher thermal conductivity, which leads to a faster cooling rate of the polymer. Furthermore, without being bound to any theory it is believed that calcium carbonate acts as nucleating agent for PET, and thus, increases the crystallization temperature of PET. As a result the crystallization rate is increased, which, for example, allows shorter cycling times during melt processing. The inventors also found that textile articles produced from multifilament fibres manufactured from polyesters including calcium carbonate fillers have an improved mechanical stiffness, thermal conductivity, and increased opacity compared to textile articles comprising multifilament fibres made from polyester only.

According to one embodiment, the calcium carbonate is ground calcium carbonate, precipitated calcium carbonate, modified calcium carbonate, surface-treated calcium carbonate, or a mixture thereof. According to one embodiment, the calcium carbonate is ground calcium carbonate. According to another embodiment, the calcium carbonate is surface-treated calcium carbonate.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the source of ground calcium carbonate (GCC) is selected from marble, chalk, dolomite, limestone, or mixtures thereof. Preferably, the source of ground calcium carbonate is selected from marble. According to one embodiment of the present invention the GCC is obtained by dry grinding. According to another embodiment of the present invention the GCC is obtained by wet grinding and subsequent drying.

"Dolomite" in the meaning of the present invention is a carbonatic calcium-magnesium-mineral having the chemical composition of $CaMg(CO_3)_2$ ("$CaCO_3 \cdot MgCO_3$"). Dolomite mineral contains at least 30.0 wt.-% $MgCO_3$, based on the total weight of dolomite, preferably more than 35.0 wt.-%, more preferably more than 40.0 wt.-% $MgCO_3$.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried. According to one embodiment of the present invention, the calcium carbonate comprises one precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

A modified calcium carbonate may feature a GCC or PCC with an internal structure modification or a surface-reacted GCC or PCC. A surface-reacted calcium carbonate may be prepared by providing a GCC or PCC in form of an aqueous suspension, and adding an acid to said suspension. Suitable acids are, for example, sulphuric acid, hydrochloric acid, phosphoric acid, citric acid, oxalic acid, or a mixture thereof. In a next step, the calcium carbonate is treated with gaseous carbon dioxide. If a strong acid such as sulphuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, or EP 2 264 108 A1.

According to one embodiment, the modified calcium carbonate is a surface-reacted calcium carbonate, preferably obtained from the reaction with sulphuric acid, hydrochloric acid, phosphoric acid, citric acid, oxalic acid, or a mixture thereof, and carbon dioxide.

A surface-treated calcium carbonate may feature a GCC, PCC, or MCC comprising a treatment or coating layer on its surface. For example, the calcium carbonate may be treated or coated with a hydrophobising surface treatment agent such as, e.g., aliphatic carboxylic acids, salts or esters thereof, or a siloxane. Suitable aliphatic acids are, for example, $C_4$ to $C_{28}$ fatty acids such as stearic acid, palmitic acid, myristic acid, lauric acid, or a mixture thereof. The calcium carbonate may also be treated or coated to become cationic or anionic with, for example, a polyacrylate or polydiallyldimethylammonium chloride (polyDADMAC). Surface-treated calcium carbonates are, for example, described in EP 2 159 258 A1.

According to one embodiment, the surface-treated calcium carbonate comprises on at least a part of its accessible area a treatment layer comprising a hydrophobising agent.

In one embodiment, the hydrophobising agent is an aliphatic carboxylic acid having a total amount of carbon atoms from $C_4$ to $C_{24}$ and/or reaction products thereof. Accordingly, at least a part of the accessible surface area of the calcium carbonate particles is covered by a treatment layer comprising an aliphatic carboxylic acid having a total amount of carbon atoms from $C_4$ to $C_{24}$ and/or reaction products thereof. The term "accessible" surface area of a material refers to the part of the material surface which is in contact with a liquid phase of an aqueous solution, suspension, dispersion or reactive molecules such as a hydrophobising agent.

The term "reaction products" of the aliphatic carboxylic acid in the meaning of the present invention refers to products obtained by contacting the at least one calcium carbonate with the at least one aliphatic carboxylic acid. Said reaction products are formed between at least a part of the applied at least one aliphatic carboxylic acid and reactive molecules located at the surface of the calcium carbonate particles.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof. For example, the aliphatic carboxylic acid is stearic acid.

Additionally or alternatively, the hydrophobising agent can be at least one mono-substituted succinic anhydride consisting of succinic anhydride mono-substituted with a group selected from a linear, branched, aliphatic and cyclic group having a total amount of carbon atoms from $C_2$ to $C_{30}$ in the substituent. Accordingly, at least a part of the accessible surface area of the calcium carbonate particles is covered by a treatment layer comprising at least one mono-substituted succinic anhydride consisting of succinic anhydride mono-substituted with a group selected from a linear, branched, aliphatic and cyclic group having a total amount of carbon atoms from $C_2$ to $C_{30}$ in the substituent and/or reaction products thereof. A branched group may have a total amount of carbon atoms from $C_3$ to $C_{30}$ in the substituent and/or reaction products thereof. A cyclic group may have a total amount of carbon atoms from $C_5$ to $C_{30}$ in the substituent and/or reaction products thereof.

The term "reaction products" of the mono-substituted succinic anhydride in the meaning of the present invention refers to products obtained by contacting the calcium carbonate with the at least one mono-substituted succinic anhydride. Said reaction products are formed between at least a part of the applied at least one mono-substituted succinic anhydride and reactive molecules located at the surface of the calcium carbonate particles.

For example, the at least one mono-substituted succinic anhydride consists of succinic anhydride mono-substituted with one group being a linear alkyl group having a total amount of carbon atoms from $C_2$ to $C_{30}$, preferably from $C_3$ to $C_{20}$ and most preferably from $C_4$ to $C_{18}$ in the substituent or a branched alkyl group having a total amount of carbon atoms from $C_3$ to $C_{30}$, preferably from $C_3$ to $C_{20}$ and most preferably from $C_4$ to $C_{18}$ in the substituent or a cyclic group having a total amount of carbon atoms from $C_5$ to $C_{30}$, preferably from $C_5$ to $C_{20}$ and most preferably from $C_5$ to $C_{18}$.

For example, the at least one mono-substituted succinic anhydride consists of succinic anhydride mono-substituted with one group being a linear alkyl group having a total amount of carbon atoms from $C_2$ to $C_{30}$, preferably from $C_3$ to $C_{20}$ and most preferably from $C_4$ to $C_{18}$ in the substituent. Additionally or alternatively, the at least one mono-substituted succinic anhydride consists of succinic anhydride mono-substituted with one group being a branched alkyl group having a total amount of carbon atoms from $C_3$ to $C_{30}$, preferably from $C_3$ to $C_{20}$ and most preferably from $C_4$ to $C_{18}$ in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

It is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear alkenyl group having a total amount of carbon atoms from $C_2$ to $C_{30}$, preferably from $C_3$ to $C_{20}$ and most preferably from $C_4$ to $C_{18}$ in the substituent or a branched alkenyl group having a total amount of carbon atoms from $C_3$ to $C_{30}$, preferably from $C_4$ to $C_{20}$ and most preferably from $C_4$ to $C_{18}$ in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenyl succinic anhydride, propenyl succinic anhydride, butenyl succinic anhydride, triisobutenyl succinic anhydride, pentenyl succinic anhydride, hexenyl succinic anhydride, heptenyl succinic anhydride, octenyl succinic anhydride, nonenyl succinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenyl succinic anhydride such as n-octenyl succinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethyl succinic anhydride and ethenyl succinic anhydride. Alternatively, the at least one mono-substituted succinic anhydride is a mixture of propyl succinic anhydride and propenyl succinic anhydride. Alternatively, the at least one mono-substituted succinic anhydride is a mixture of butyl succinic anhydride and butenyl succinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentyl succinic anhydride and pentenyl succinic anhydride. Alternatively, the at least one mono-substituted succinic anhydride is a mixture of hexyl succinic anhydride and hexenyl succinic anhydride. Alternatively, the at least one mono-substituted succinic anhydride is a mixture of heptyl succinic anhydride and heptenyl succinic anhydride. Alternatively, the at least one mono-substituted succinic anhydride is a mixture of octyl succinic anhydride and octenyl succinic anhydride. Alternatively, the at least one mono-substituted succinic anhydride is a mixture of nonyl succinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonyl succinic anhydride and nonenyl succinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

Additionally or alternatively, the hydrophobising agent may be a phosphoric acid ester blend. Accordingly, at least a part of the accessible surface area of the calcium carbonate particles is covered by a treatment layer comprising a phosphoric acid ester blend of one or more phosphoric acid mono-ester and/or reaction products thereof and one or more phosphoric acid di-ester and/or reaction products thereof.

The term "reaction products" of the phosphoric acid mono-ester and one or more phosphoric acid di-ester in the meaning of the present invention refers to products obtained by contacting the calcium carbonate with the at least one phosphoric acid ester blend. Said reaction products are formed between at least a part of the applied phosphoric acid ester blend and reactive molecules located at the surface of the calcium carbonate particles.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from $C_6$ to $C_{30}$ in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from $C_8$ to $C_{22}$, more preferably from $C_8$ to $C_{20}$ and most preferably from $C_8$ to $C_{18}$ in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester, 2-octyl-1-dodecyl phosphoric acid mono-ester and mixtures thereof. In one embodiment of the present invention, the one or more phosphoric acid mono-ester is 2-octyl-1-dodecyl phosphoric acid mono-ester.

It is appreciated that the expression "one or more" phosphoric acid di-ester means that one or more kinds of phosphoric acid di-ester may be present in the coating layer of the calcium carbonate and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from $C_6$ to $C_{30}$ in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from $C_8$ to $C_{22}$, more preferably from $C_8$ to $C_{20}$ and most preferably from $C_8$ to $C_{18}$ in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester, 2-octyl-1-dodecyl phosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester, 2-octyl-1-dodecyl phosphoric acid di-ester and mixtures thereof. In one embodiment of the present invention, the one or more phosphoric acid di-ester is 2-octyl-1-dodecyl phosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester, 2-octyl-1-dodecyl phosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester, 2-octyl-1-dodecyl phosphoric acid di-ester and mixtures thereof.

For example, at least a part of the accessible surface area of the calcium carbonate comprises a phosphoric acid ester blend of one phosphoric acid mono-ester and/or reaction products thereof and one phosphoric acid di-ester and/or reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester and 2-octyl-1-dodecyl phosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester and 2-octyl-1-dodecyl phosphoric acid di-ester.

The phosphoric acid ester blend comprises the one or more phosphoric acid mono-ester and/or reaction products thereof to the one or more phosphoric acid di-ester and/or reaction products thereof in a specific molar ratio. In particular, the molar ratio of the one or more phosphoric acid mono-ester and/or reaction products thereof to the one or more phosphoric acid di-ester and/or reaction products thereof in the treatment layer and/or the phosphoric acid ester blend is from 1:1 to 1:100, preferably from 1:1.1 to 1:60, more preferably from 1:1.1 to 1:40, even more preferably from 1:1.1 to 1:20 and most preferably from 1:1.1 to 1:10.

The wording "molar ratio of the one or more phosphoric acid mono-ester and reaction products thereof to the one or more phosphoric acid di-ester and reaction products thereof" in the meaning of the present invention refers to the sum of the molecular weight of the phosphoric acid mono-ester molecules and/or the sum of the molecular weight of the phosphoric acid mono-ester molecules in the reaction products thereof to the sum of the molecular weight of the phosphoric acid di-ester molecules and/or the sum of the molecular weight of the phosphoric acid di-ester molecules in the reaction products thereof.

In one embodiment of the present invention, the phosphoric acid ester blend coated on at least a part of the surface of the calcium carbonate may further comprise one or more phosphoric acid tri-ester and/or phosphoric acid and/or reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent.

It is appreciated that the expression "one or more" phosphoric acid tri-ester means that one or more kinds of phosphoric acid tri-ester may be present on at least a part of the accessible surface area of the calcium carbonate.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

According to one embodiment, the surface-treated calcium carbonate comprises on at least a part of its accessible surface area a treatment layer comprising a hydrophobising agent, preferably the hydrophobising agent is selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, and mixtures thereof, and more preferably the hydrophobising agent is a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof and/or a phosphoric acid ester blend of one or more phosphoric acid mono-ester and/or reaction products thereof and one or more phosphoric acid di-ester and/or reaction products thereof.

According to one embodiment, the calcium carbonate has a weight median particle size $d_{50}$ from 0.1 to 3 μm, preferably from 0.4 to 2.5 μm, more preferably from 1.0 to 2.3 μm, and most preferably from 1.2 to 2 μm. In addition or alternatively, the calcium carbonate has an top cut particle size $d_{98}$ from 1 to 10 μm, preferably from 5 to 8 μm, more preferably from 4 to 7 μm, and most preferably from 6 to 7 μm.

According to the present invention, the calcium carbonate is present in the multifilament fibre in an amount of at least 2 wt.-%, based on the total weight of the multifilament fibre. The calcium carbonate can be present in the multifilament fibre in an amount from 2 to 50 wt.-%, preferably from 5 to 40 wt.-%, more preferably from 8 to 35 wt.-%, and most preferably from 10 to 30 wt.-%, based on the total weight of the multifilament fibre. According to one embodiment, the calcium carbonate is dispersed within the at least one polymer and is present in an amount from 2 to 50 wt.-%, preferably from 5 to 40 wt.-%, more preferably from 8 to 35 wt.-%, and most preferably from 10 to 30 wt.-%, based on the total weight of the at least one polymer.

According to one embodiment, the at least one filler consists of calcium carbonate. The calcium carbonate may consist of only one specific type of calcium carbonate or a mixture of two or more types of calcium carbonates.

According to another embodiment, the at least one filler comprises further mineral pigments. Examples for further pigment particles comprise silica, alumina, titanium dioxide, clay, calcined clays, talc, kaolin, calcium sulphate, wollastonite, mica, bentonite, barium sulphate, gypsum, or zinc oxide.

According to one embodiment, the at least one filler comprises at least 50 wt.-%, preferably at least 75 wt.-%, more preferably at least 90 wt.-%, and most preferably at least 95 wt.-% calcium carbonate, based on the total amount of the at least one filler.

According to one embodiment, the at least one filler is present in the multifilament fibre in an amount from 0.1 to 50 wt.-%, preferably from 0.2 to 40 wt.-%, and more preferably from 1 to 35 wt.-%, based on the total weight of the multifilament fibre.

According to another embodiment, the at least one filler is dispersed within the at least one polymer and is present in an amount from 1 to 50 wt.-%, preferably from 2 to 40 wt.-%, and more preferably from 5 to 35 wt.-%, based on the total weight of the at least one polymer.

According to one aspect of the present invention, the use of calcium carbonate as filler in a multifilament fibre comprising at least one polymer comprising a polyester is provided, wherein the calcium carbonate is present in the multifilament fibre in an amount of at least 2 wt.-%, based on the total weight of the multifilament fibre. According to one preferred embodiment of the present invention, the use of calcium carbonate as filler in a textile article comprising a polyethylene terephthalate and/or a polybutylene terephthalate is provided, wherein the calcium carbonate is present in the multifilament fibre in an amount of at least 2 wt.-%, based on the total weight of the multifilament fibre.

The Multifilament Fibre

According to the present invention, a multifilament fibre is provided comprising at least one polymer comprising a polyester, and at least one filler comprising calcium carbonate, wherein the calcium carbonate is present in the multifilament fibre in an amount of at least 2 wt.-%, based on the total weight of the multifilament fibre.

The filaments of the multifilament fibre can have any possible cross-section shape. Examples of possible cross-section shapes are circular, oval, angular, e.g., triangular or rectangular, lobal, e.g. trilobal, pentalobal, hexalobal, or octalobal, serrated, dumbbell-shaped, bean-shaped, kidney-shaped, ribbonlike, or irregular. The filaments of the multifilament fibre can also be solid or hollow and/or multi-component filaments such as bi-component filaments and/or tri-component filaments.

According to one embodiment, the multifilament fibre is a multifilament yarn, preferably a multiple wound yarn, a cabled yarn, a folded yarn, an interlaced yarn, a twisted yarn and/or a tow yarn.

The number of filaments of the multifilament fibre can vary greatly and will be suitably selected by the skilled person depending on the desired application. According to one embodiment, the multifilament fibre is composed of at least two filaments, preferably at least 10 filaments, more preferably at least 50 filaments, even more preferably at least 100 filaments, and most preferably at least 200 filaments.

The multifilament fibre can have a diameter from 1 to 600 μm, preferably from 3 to 400 μm, more preferably from 5 to 300 μm, and most preferably from 8 to 200 μm.

According to one embodiment of the present invention the multifilament fibre has a linear mass density from 0.5 to 4000 dtex, preferably from 1 to 3000 dtex, more preferably from 10 to 2000 dtex, and most preferably from 100 to 1500 dtex.

In addition to the at least one polymer and the at least one filler, the multifilament fibre may comprise further additives, for example, waxes, optical brighteners, heat stabilizers, antioxidants, anti-static agents, anti-blocking agents, dyestuffs, pigments, lustre improving agents, surfactants, natural oils, or synthetic oils.

The multifilament fibre may also comprise further inorganic fibres, preferably glass fibres, carbon fibres, or metal fibres. Alternatively or additionally, natural fibres such as cotton, linen, silk, or wool may be added.

According to one embodiment, the multifilament fibre consists of the at least one polymer comprising a polyester and the at least one filler comprising calcium carbonate. According to another embodiment, the multifilament fibre comprises at least one polymer comprising a polyethylene terephthalate and/or a polybutylene terephthalate and at least one filler comprising calcium carbonate. According to still another embodiment, the multifilament fibre consists of a polyethylene terephthalate and/or polybutylene terephthalate and calcium carbonate. According to one embodiment, the calcium carbonate is ground calcium carbonate. According to another embodiment, the calcium carbonate is a surface-treated calcium carbonate comprising on at least a part of its accessible surface area a treatment layer comprising a hydrophobising agent. Preferably the hydrophobising agent is a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof and/or a phosphoric acid ester blend of one or more phosphoric acid mono-ester and/or reaction products thereof and one or more phosphoric acid di-ester and/or reaction products thereof.

According to an exemplary embodiment, the multifilament fibre comprises the at least one polymer in an amount from 50 to 98 wt.-%, and the at least one filler in an amount from 2 to 50 wt.-%, based on the total weight of the multifilament fibre, preferably the at least one polymer in an amount from 60 to 95 wt.-%, and the at least one filler in an amount from 5 to 40 wt.-%, more preferably the at least one polymer in an amount from 65 to 92 wt.-%, and the at least one filler in an amount from 8 to 35 wt.-%, and most preferably the at least one polymer in an amount from 70 to 90 wt.-%, and the at least one filler in an amount from 10 to 30 wt.-%.

According to the present invention, a process for producing a multifilament fibre is provided, comprising the steps of
a) providing a mixture comprising at least one polymer comprising a polyester and at least one filler comprising calcium carbonate,
b) melting the mixture of step a) and passing the same through shaped orifices to form a multifilament fibre, and
c) quenching the multifilament fibre,
wherein the calcium carbonate is present in the multifilament fibre in an amount of at least 2 wt.-%, based on the total weight of the multifilament fibre.

The mixture of the at least one polymer comprising a polyester and at the least one filler comprising calcium carbonate provided in process step a) can be prepared by any method known in the art. For example, the at least one polymer and the at least one filler may be dry blended, melt blended and optionally formed into granulates or pellets, or a masterbatch of the at least one polymer and the at least one filler may be premixed, optionally formed into granulates or pellets, and mixed with additional polymer or filler.

According to one embodiment the mixture of step a) is a mixture of a masterbatch and an additional polymer, wherein the masterbatch comprises at least one polymer comprising a polyester and at least one filler comprising calcium carbonate. According to one embodiment, the calcium carbonate is present in the masterbatch in an amount from 10 to 85 wt.-%, preferably from 20 to 80 wt.-%, more preferably from 30 to 75 wt.-%, and most preferably from 40 wt.-% to 75 wt.-%, based on the total weight of the masterbatch.

The melting temperature of process step b) will depend on the melting temperature of the polymer. In addition or alternatively, pressure may applied. Suitable temperatures and pressures are known to the skilled person. According to one embodiment, step b) is carried out at a temperature between 150 and 300° C., preferably between 200 and 290° C., and more preferably between 250 and 280° C.

The shape of the orifices will depend on the desired cross-section shape of the filaments of the multifilament fibre and can be, for example, circular, oval, angular, e.g., triangular or rectangular, lobal, e.g. trilobal, pentalobal, hexalobal, or octalobal, serrated, dumpbell-shaped, bean-shaped, kidney-shaped, ribbonlike, or irregular. The number of the orifices will depend on the desired number of filaments and can be, for example, at least 2, at least 10, at least 50, at least 100, or at least 200.

After exiting the shaped orifices, the filaments are quenched in order to solidify them. Typically, the obtained filaments are quenched by a transversely directed stream of air or inert gas, which cools the filaments and solidifies them.

The multifilament fibres formed in the process of the present invention may be drawn or elongated to induce molecular orientation and affect crystallinity. This may result in a reduction in diameter and an improvement in physical properties.

According to one embodiment the process further comprises a step d) of drawing the multifilament fibre. The fibre may be drawn or elongated with the help of godet wheels. The length to which the multifilament fibre is drawn will dependent upon the desired properties. For higher tenacity, the multifilament fibre may be drawn to a greater extend. According to one embodiment, the multifilament fibre is drawn up to two times, three times, four times, five times, or six times its original length.

According to one embodiment, the multifilament fibre obtained by the process of the present invention is heat-setted, preferably at a temperature from 100° C. to 250°, preferably from 140° C. to 220° C. Heat-setting may impart dimensional stability to the multifilament fibre by bringing the macromolecules closer to their equilibrium state, so that resistance to thermal shrinkage, dimensional changes, curling or snarling of twisted yarns, or creasing of fabrics can be attained.

According to one embodiment, the multifilament fibre obtained by the process of the present invention is textured. The texturing is a procedure used to increase the volume and the elasticity of a multifilament fibre. When textured, flat filaments can acquire volume and bulk. The texturing step can be carried out separately or, if the drawing step d) is present, the multifilament fibre can be textured during or after the drawing step d).

According to another embodiment, the multifilament fibre obtained by the process of the present invention is twisted. Twisting of the filaments may improve cohesion and durability of the multifilament fibre. The direction of the twist may be to the right, described as Z twist, or to the left, described as S twist. Single yarn can be formed by twisting filaments in one direction. Ply yarn can made by twisting two or more single yarns together, usually by combining singles twisted in one direction with a ply twist in the opposite direction. Twine, cord, or rope can be made with a cable twist, each twist in the opposite direction of the preceding twist (S/Z/S or Z/S/Z), or with a hawser twist, the single yarns and the first ply twist in one direction and the second ply twist in the opposite direction (S/S/Z or Z/Z/S). The number of turns per unit of length in a yarn affects the appearance and durability of fabric made from that yarn. Yarns used for soft-surfaced fabrics have less twist than those used for smooth-surfaced fabrics. Yarns made into crepe fabrics have maximum twist. The texturing step can be carried out separately or, if the drawing step d) is present, the multifilament fibre can be twisted during or after the drawing step d).

According to a further aspect of the present invention, a textile article comprising at least one multifilament fibre according to the present invention is provided.

The textile article can be a layered, plaited, braided, knotted, woven, knitted, crocheted, tufted or non-woven material. In addition said material may be reinforced by reinforcement threads in form of a textile surface structure, preferably in form of a fabric, laying, knitted fabric, knitwear or nonwoven fabric. According to one embodiment, the textile article is a woven or a non-woven fabric.

According to one embodiment the textile article is selected from construction products, consumer apparel, industrial apparel, medical products, home furnishings, protective products, packaging materials, cosmetic products, hygiene products, filtration materials, hoses, power belts, ropes, nets, threads, tire cords, auto upholsteries, sails, floppy disk liners, or fibrefills.

According to another aspect of the present invention, a use of at least one multifilament fibre according to the present invention for producing a textile article is provided. A textile article may be produced from the at least one multifilament fibre by layering, plaiting, braiding, knotting, weaving, knitting, crocheting, or tufting. A nonwoven textile article or fabric may be formed by collecting the multifilament fibres on a surface or carrier, for example, a moving screen or a forming wire, followed by an optional bonding step. Examples of bonding methods include thermal point bonding or calendering, ultrasonic bonding, hydroentanglement, needling and through-air bonding. According to one embodiment, a non-woven material is formed by dry or wet laying.

In addition, the produced textile article can be subjected to a post-treatment step, such as direction orientation, creping, hydroentanglement, or embossing processes.

The at least one multifilament fibre according to the present invention and/or the textile article according to the present invention can be used in many different applications. According to one embodiment the at least one multifilament fibre according to the present invention and/or the textile article according to the present invention is used in construction products, waterproofing, thermal insulation, soundproofing, roofing, consumer apparel, upholstery and clothing industries, industrial apparel, medical products, home furnishings, protective products, packaging materials, cosmetic products, hygiene products, filtration materials, agritechnical applications, building application, geotechnical applications, industrial applications, medical applications, transporting, ecotechnical applications, packaging applications, personal protection, property protection, or sport applications.

Examples for construction products are house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control products, canals construction, drainage systems, geomembranes protection and frost protection products, agriculture mulch, pond and canal water barriers, or sand infiltration barriers for drainage tile. Other examples for construction products are fixations or reinforcements for earth fillings.

Examples for consumer apparel are interlinings, clothing and glove insulation, bra and shoulder paddings, handbag components, or shoe components. Examples for industrial apparel are tarps, tents, or transportation (lumber, steel) wrappings.

Examples of medical products are protective clothing, face masks, isolation gowns, surgical gowns, surgical drapes and covers, surgical scrub suits, caps, sponges, dressings, wipes, orthopedic padding, bandages, tapes, dental bibs, oxygenators, dialyzers, filters for IV solutions or blood, or transdermal drug delivery components. Examples for home furnishings are pillows, cushions, paddings in quilts or comforters, dust covers, insulators, window treatments, blankets, drapery components, carpet backings, or carpets.

Examples for protective products are coated fabrics, reinforced plastic, protective clothing, lab coats, sorbents, or flame barriers. Examples of packaging materials are desiccant packing, sorbents packaging, gifts boxes, files boxes, various nonwoven bags, book covers, mailing envelopes, express envelopes, or courier bags. Examples of filtration materials are gasoline, oil and air filters, including filtration liquid cartridge and bag filters, vacuum bags, or laminates with non woven layers.

The scope and interest of the invention will be better understood based on the following examples which are intended to illustrate certain embodiments of the present invention and are non-limitative.

EXAMPLES

1. Measurement Methods and Materials

In the following, measurement methods and materials implemented in the examples are described.

Particle Size

The particle distribution of the calcium carbonate filler was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Titer or Linear Density

The titer or linear density [dtex] was measured according to EN ISO 2062 and corresponds to the weight in grams of 10,000 m yarn. A sample of 25 or 100 metres was wound up on a standard reel under a pretension of 0.5 cN/tex and weighted on analytical scale. The grams per 10,000 m yarn length were then calculated.

Tenacity, Maximum Force and Elongation at Maximal Load

The tenacity was calculated from the breaking force and the linear density, and expressed in centinewton per dtex [cN/dtex]. The test was carried out on a dynamometer with a constant stretching speed. The maximum force is the force which can be maximally applied on a yarn and is expressed in Newton [N]. The elongation is the increase of the length produced by stretching a yarn to its maximal load and is expressed as a percentage [%] of its initial length. Applicable standards for these tests are EN ISO 5079 and ASTM D 3822.

Ash Content

The ash content in [%] of the fibres and the masterbatches was determined by incineration of a sample in an incineration crucible which is put into an incineration furnace at 570° C. for 2 hours. The ash content is measured as the total amount of remaining inorganic residues.

2. Materials

PET: Polyethylene terephthalate, 4060, commercially available from INVISTA Resins & Fibres GmbH, Germany (intrinsic viscosity: 0.66-0.68 dl/g; carboxylic endgroups <50 meq/kg; diethylene glycol ≤1.1 wt.-%; amorphous polymer; crystallization at 140-180° C. for 30-60 min). Data taken from suppliers Technical Data Sheet (TDS).

PBT: Polybutylene terephthtalate, Valox 315, commercially available from Sabic Innovative Plastics BV, Netherlands (melt viscosity: 7500 poise; Melt volume rate, MVR at 250° C./1.2 kg: 6 cm³/10 min). Data taken from suppliers Technical Data Sheet (TDS).

CC1: Ground calcium carbonate, available from Omya International AG, Switzerland ($d_{50}$:1.7 µm; $d_{98}$:6 µm, untreated).

CC2: Ground calcium carbonate, commercially available from Omya International AG, Switzerland ($d_{50}$:1.7 µm; $d_{98}$:6 µm), surface-treated with 1 wt.-% stearic acid (commercially available from Sigma-Aldrich, Croda), based on the total weight of the ground calcium carbonate.

CC3: Ground calcium carbonate, commercially available from Omya International AG, Switzerland ($d_{50}$:1.7 µm; $d_{98}$:6 µm), surface-treated with 1.1 wt.-% polymethylhydrogen siloxane (Silres BS94, commercially available from Wacker Chemie AG, Germany), based on the total weight of the ground calcium carbonate.

CC4: Ground calcium carbonate, commercially available from Omya International AG, Switzerland ($d_{50}$:1.7 µm; $d_{98}$:6 µm), surface-treated with 0.7 wt.-% succinic anhydride (Hydrores AS 1000, commercially available from Kemira Germany GmbH, Germany), based on the total weight of the ground calcium carbonate.

3. Examples

Example 1

Preparation of Masterbatches

Masterbatches containing PBT or PET and one of the calcium carbonate fillers CC1 to CC4 were prepared on a lab scale Buss kneader (MKS 30 for PET and PR46 for PBT from Buss AG, Switzerland). The polymer PET was pre-dried prior processing in an oven at 160° C. for 4 hours. The compositions and filler contents of the prepared masterbatches are compiled in Table 1 below. The precise filler content was determined by the ash content.

TABLE 1

Composition and filler content of prepared masterbatches.

| Masterbatch | Polymer | Filler | Ash content [wt.-%] |
|---|---|---|---|
| MB1 | PBT | CC1 | 49.9 |
| MB2 | PBT | CC2 | 48.7 |

TABLE 1-continued

Composition and filler content of prepared masterbatches.

| Masterbatch | Polymer | Filler | Ash content [wt.-%] |
|---|---|---|---|
| MB3 | PBT | CC3 | 48.7 |
| MB4 | PBT | CC4 | 49.0 |
| MB5 | PET | CC1 | 49.4 |
| MB6 | PET | CC2 | 49.0 |
| MB7 | PET | CC3 | 49.3 |
| MB8 | PET | CC4 | 48.6 |

Example 2

Preparation of Multifilament Fibres

Different amounts of the masterbatches produced according to Example 1 were mixed with further PBT or PET, wherein PET was pre-dried prior processing an oven at 160° C. for 4 hours. Multifilament fibres were produced from the obtained mixtures using a Collin Multifilament Lab Line CMF 100 (Dr. Collin GmbH, Germany), equipped with a single screw extruder with melt pump and spinneret diameter 50 mm with 34 filaments having a diameter of 0.3 mm. The spinning system was also equipped with a cooling chamber for quenching the multifilament fibre and stretching godets and a winder. Limanol 35F/1 (commercially available from Schill+Seilacher GmbH, Germany) was used as spinning oil. The machine conditions are given in Table 2 below. The compositions of the produced multifilament fibres are compiled in Table 3 below.

The mechanical properties of the testing samples were determined using the elongation at maximum force test and tenacity test described above. The results of the mechanical tests are shown in Table 4 below.

TABLE 2

Machine conditions for multifilament fibre spinning.

| Parameter | Multifilament fibres with PBT | Multifilament fibres with PET |
|---|---|---|
| Extruder temperature | 270-280° C. | 300° C. |
| Pump temperature | 270° C. | 300° C. |
| Bypass temperature | 270° C. | 300° C. |
| Adapter temperature | 270° C. | 300° C. |
| Die temperature | 270° C. | 300° C. |
| Godet Roll temperatures | Roll1: 180° C. | Roll 1: 130° C. |
| | Roll 2: 180° C. | Roll 2: 130° C. |
| | Roll 3: 160° C. | Roll 3: 100° C. |
| | Roll 4: 160° C. | Roll 4: 100° C. |
| Draw ratio | 2, 3 or 4 | 2 |

TABLE 3

Composition and draw ratio of produced multifilament fibres.

| Sample | Polymer | Masterbatch | Masterbatch filler content [wt.-%] | Ash content [wt.-%] | Draw ratio |
|---|---|---|---|---|---|
| 1 | PBT | — | — | — | 2 |
| 2 | PBT | MB1 | 2 | 1.9 | 2 |
| 3 | PBT | MB1 | 5 | 2.6 | 2 |
| 4 | PBT | MB1 | 10 | 9.7 | 2 |
| 5 | PBT | MB2 | 2 | 1.4 | 2 |
| 6 | PBT | MB2 | 5 | 4.6 | 2 |
| 7 | PBT | MB2 | 10 | 10.8 | 2 |
| 8 | PBT | MB2 | 20 | 19.3 | 2 |
| 9 | PBT | MB2 | 30 | 28.9 | 2 |

TABLE 3-continued

Composition and draw ratio of produced multifilament fibres.

| Sample | Polymer | Masterbatch | Masterbatch filler content [wt.-%] | Ash content [wt.-%] | Draw ratio |
|---|---|---|---|---|---|
| 10 | PBT | MB3 | 2 | 2.2 | 2 |
| 11 | PBT | MB3 | 5 | 4.9 | 2 |
| 12 | PBT | MB3 | 10 | 10.0 | 2 |
| 13 | PBT | MB3 | 20 | 19.4 | 2 |
| 14 | PBT | MB4 | 2 | 2.5 | 2 |
| 15 | PBT | MB4 | 5 | 4.0 | 2 |
| 16 | PBT | MB4 | 10 | 9.4 | 2 |
| 17 | PBT | MB4 | 20 | 20.4 | 2 |
| 18 | PBT | MB4 | 30 | 26.5 | 2 |
| 19 | PET | — | — | — | 2 |
| 20 | PET | MB5 | 2 | 1.7 | 2 |
| 21 | PET | MB5 | 5 | 3.5 | 2 |
| 22 | PET | MB51 | 10 | 6.2 | 2 |
| 23 | PET | MB5 | 20 | 18.4 | 2 |
| 24 | PET | MB6 | 2 | 2.2 | 2 |
| 25 | PET | MB6 | 5 | 5.1 | 2 |
| 26 | PET | MB6 | 10 | 7.3 | 2 |
| 27 | PET | MB7 | 2 | 2.4 | 2 |
| 28 | PET | MB7 | 5 | 3.8 | 2 |
| 29 | PET | MB7 | 10 | 11.1 | 2 |
| 30 | PET | MB7 | 20 | 18.4 | 2 |
| 31 | PET | MB8 | 2 | 2.3 | 2 |
| 32 | PET | MB8 | 5 | 5.5 | 2 |
| 33 | PET | MB8 | 10 | 9.5 | 2 |
| 34 | PET | MB8 | 20 | 18.6 | 2 |
| 35 | PET | MB8 | 30 | 23.2 | 2 |
| 36 | PBT | — | — | — | 4 |
| 37 | PBT | MB1 | 2 | 1.9 | 4 |
| 38 | PBT | MB1 | 4 | 2.8 | 3 |
| 39 | PBT | MB1 | 10 | 9.0 | 3 |

TABLE 4

Mechanical properties and linear density of the produced multifilament fibres.

| Sample | Maximum force [N] | Elongation at maximum force [%] | Tenacity [cN/dtex] | Linear density [dtex] |
|---|---|---|---|---|
| 1 | 8.29 | 118.6 | 0.81 | 1024 |
| 2 | 6.30 | 104.9 | 0.92 | 680 |
| 3 | 4.68 | 58.4 | 0.62 | 746 |
| 4 | 3.70 | 34.6 | 0.48 | 766 |
| 5 | 5.97 | 106.3 | 0.8 | 741 |
| 6 | 4.80 | 97.6 | 0.64 | 737 |
| 7 | 4.80 | 129.2 | 0.64 | 737 |
| 8 | 3.65 | 29.5 | 0.44 | 807 |
| 9 | 2.53 | 5.3 | 0.28 | 869 |
| 10 | 5.25 | 61.8 | 0.74 | 700 |
| 11 | 4.79 | 96.4 | 0.58 | 821 |
| 12 | 3.52 | 25.8 | 0.52 | 668 |
| 13 | 3.70 | 14.0 | 0.45 | 825 |
| 14 | 6.51 | 97.9 | 0.87 | 742 |
| 15 | 5.36 | 56.3 | 0.73 | 734 |
| 16 | 3.90 | 23.5 | 0.53 | 730 |
| 17 | 2.99 | 6.5 | 0.34 | 824 |
| 18 | 6.51 | 97.9 | 0.87 | 518 |
| 19 | 7.07 | 163.4 | 1.82 | 386 |
| 20 | 3.21 | 41.8 | 1.06 | 294 |
| 21 | 3.07 | 68.9 | 0.84 | 356 |
| 22 | 3.79 | 91.0 | 0.82 | 460 |
| 23 | 1.84 | 36.3 | 0.33 | 556 |
| 24 | 3.14 | 97.7 | 1.11 | 284 |
| 25 | 4.22 | 91.5 | 0.96 | 428 |
| 26 | 2.78 | 74.0 | 0.71 | 386 |
| 27 | 4.86 | 92.4 | 1.09 | 440 |
| 28 | 4.38 | 105.0 | 0.95 | 442 |
| 29 | 3.32 | 90.3 | 0.61 | 523 |
| 30 | 2.74 | 99.6 | 0.43 | 607 |
| 31 | 4.32 | 108.7 | 0.91 | 470 |
| 32 | 4.17 | 130.6 | 0.86 | 474 |
| 33 | 4.20 | 77.5 | 0.88 | 466 |
| 34 | 2.89 | 120.6 | 0.49 | 571 |
| 35 | 1.21 | 16.0 | 0.21 | 571 |
| 36 | 10.80 | 19.0 | 1.12 | 960 |
| 37 | 11.30 | 20.0 | 2.74 | 397 |
| 38 | 6.70 | 20.0 | 1.26 | 463 |
| 39 | 4.68 | 14.0 | 0.9 | 403 |

The results shown in Table 4 reveal that polybutylene and polyethylene multifilament fibres comprising a calcium carbonate filler can be produced in good quality and mechanical properties with different filler amounts and draw ratio. Furthermore, it can be gathered from Table 4 that the calcium carbonate containing multifilament fibres show less elongation at maximum force and less tenacity, i.e. improved mechanical stiffness, compared to the multifilament fibres without calcium carbonate.

The invention claimed is:

1. A multifilament fibre comprising
   at least one polymer comprising a polyester, and
   at least one filler comprising calcium carbonate, wherein the calcium carbonate is present in the multifilament fibre in an amount of at least 2 wt.-%, based on the total weight of the multifilament fibre and the calcium carbonate is a surface-treated calcium carbonate comprising on at least a part of its accessible surface area a treatment layer comprising a hydrophobising agent, where the hydrophobising agent is selected from a phosphoric acid ester blend of one or more phosphoric acid mono-ester and/or reaction products thereof and one or more phosphoric acid di-ester and/or reaction products thereof and mixtures thereof.

2. The multifilament fibre of claim 1, wherein the polyester is selected from the group consisting of a polyglycolic acid, a polycaprolactone, a polyethylene adipate, a polyhydroxyalkanoate, a polyhydroxybutyrate, a polyalkylene terephthalate, a polyethylene terephthalate, a polytrimethylene terephthalate, a polybutylene terephthalate, a polyethylene naphthalate, a polylactic acid, or a mixture thereof, or copolymers thereof.

3. The multifilament fibre of claim 1, wherein the polyester is a polyethylene terephthalate and/or a polybutylene terephthalate.

4. The multifilament fibre of claim 1, wherein the calcium carbonate has a weight median particle size d50 from 0.1 to 3 μm.

5. The multifilament fibre of claim 1, wherein the calcium carbonate is present in the multifilament fibre in an amount from 2 to 50 wt.-%, based on the total weight of the multifilament fibre.

6. The multifilament fibre of claim 1, wherein the multifilament fibre has a linear mass density from 284 to 4000 dtex.

7. A textile article comprising at least one multifilament fibre according to claim 1.

8. The textile article according to claim 7, wherein said textile article is selected from construction products, consumer apparel, industrial apparel, medical products, home furnishings, protective products, packaging materials, cosmetic products, hygiene products, filtration materials, hoses, power belts, ropes, nets, threads, tire cords, auto upholsteries, sails, floppy disk liners, or fibrefills.

9. A process for producing a multifilament fibre comprising the steps of
   a) providing a mixture comprising at least one polymer comprising a polyester and at least one filler comprising calcium carbonate,
   b) melting the mixture of step a) and passing the same through shaped orifices to form a multifilament fibre, and
   c) quenching the multifilament fibre,
   wherein the calcium carbonate is present in the multifilament fibre in an amount of at least 2 wt.-%, based on the total weight of the multifilament fibre and the calcium carbonate is a surface-treated calcium carbonate comprising on at least a part of its accessible surface area a treatment layer comprising a hydrophobising agent, where the hydrophobising agent is selected from a phosphoric acid ester blend of one or more phosphoric acid mono-ester and/or reaction products thereof and one or more phosphoric acid di-ester and/or reaction products thereof and mixtures thereof.

10. The process of claim 9, wherein the mixture of step a) is a mixture of a masterbatch and an additional polymer, wherein the masterbatch comprises at least one polymer comprising a polyester and at least one filler comprising calcium carbonate.

11. The process of claim 9, wherein the process further comprises a step d) of drawing the multifilament fibre.

12. A process for producing a textile article comprising incorporating and/or manipulating at least one multifilament fibre according to claim 1 to produce the textile article.

13. The multifilament fibre according to claim 1 and/or a textile article comprising at least one multifilament fibre according to claim 1, wherein the multifilament fibre and/or textile article is suitable for use in construction products, waterproofing, thermal insulation, soundproofing, roofing, consumer apparel, upholstery and clothing industries, industrial apparel, medical products, home furnishings, protective products, packaging materials, cosmetic products, hygiene products, filtration materials, agritechnical applications, building applications, geotechnical applications, industrial applications, medical applications, transporting, ecotechnical applications, packaging applications, personal protection, property protection, or sport applications.

14. The multifilament fibre of claim 1, wherein the calcium carbonate has a weight median particle size d50 from 1.2 to 2.0 µm.

15. The multifilament fibre of claim 1, wherein the calcium carbonate is present in the multifilament fibre in an amount from 10 wt.-% to 30 wt.-%, based on the total weight of the multifilament fibre.

16. The multifilament fibre of claim 1, wherein the multifilament fibre has a linear mass density from 294 to 4000 dtex.

17. The process of claim 9, wherein the mixture of step a) is a mixture of a masterbatch and an additional polymer, wherein the masterbatch comprises at least one polymer comprising a polyester and at least one filler comprising calcium carbonate, and in the masterbatch the calcium carbonate is present in an amount from 40 wt.-% to 75 wt.-%, based on the total weight of the masterbatch.

18. The process of claim 12, wherein the incorporating and/or manipulating comprises layering, plaiting, braiding, knotting, weaving, knitting, crocheting, tufting, collecting on a surface or a carrier, bonding, thermal point bonding, calendering, ultrasonic bonding, hydroentanglement, needling, through-air bonding, dry laying, wet laying, direction orientation, creping, or embossing.

19. The multifilament fibre of claim 1, wherein the multifilament fibre has a linear mass density from 403 to 1500 dtex.

20. The process of claim 9, wherein the multifilament fibre has a linear mass density from 284 to 4000 dtex.

* * * * *